(12) United States Patent
Zuniga et al.

(10) Patent No.: US 6,450,868 B1
(45) Date of Patent: *Sep. 17, 2002

(54) CARRIER HEAD WITH MULTI-PART FLEXIBLE MEMBRANE

(75) Inventors: Steven M. Zuniga, Soquel; Hung Chih Chen; Ming Kuie Tseng, both of San Jose, all of CA (US)

(73) Assignee: Applied Materials, Inc., Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/535,575

(22) Filed: Mar. 27, 2000

(51) Int. Cl.[7] .............................................. B24B 47/00
(52) U.S. Cl. ......................... 451/388; 451/398; 451/288
(58) Field of Search ................................ 451/285, 286, 451/287, 288, 289, 290, 388, 397, 398, 41

(56) References Cited

U.S. PATENT DOCUMENTS

| | | | |
|---|---|---|---|
| 4,918,869 A | 4/1990 | Kitta | |
| 5,193,316 A | 3/1993 | Olmstead | |
| 5,205,082 A | 4/1993 | Shendon et al. | |
| 5,423,716 A | 6/1995 | Strasbaugh | |
| 5,449,316 A | 9/1995 | Strasbaugh | |
| 5,584,746 A | * 12/1996 | Tanaka et al. | 451/41 |
| 5,584,751 A | 12/1996 | Kobayashi et al. | |
| 5,615,597 A | 4/1997 | Schoenmeyr | |
| 5,624,299 A | 4/1997 | Shendon | |
| 5,643,053 A | 7/1997 | Shendon | |
| 5,643,061 A | 7/1997 | Jackson et al. | |
| 5,759,918 A | 6/1998 | Hoshizaki et al. | |
| 5,803,799 A | 9/1998 | Volodarsky et al. | |
| 5,851,140 A | 12/1998 | Barns et al. | |
| 5,879,220 A | 3/1999 | Hasegawa et al. | |
| 5,957,751 A | 9/1999 | Govzman et al. | |
| 5,964,653 A | 10/1999 | Perlov et al. | |
| 5,985,094 A | * 11/1999 | Mosca | 156/345 |
| 6,165,058 A | 12/2000 | Zuniga et al. | |
| 6,210,255 B1 | * 4/2001 | Zuniga et al. | 451/41 |

FOREIGN PATENT DOCUMENTS

| | | |
|---|---|---|
| EP | 0 841 123 A1 | 5/1998 |
| EP | 1 029 633 A | 8/2000 |
| JP | 2243263 | 9/1990 |
| WO | WO 99/07516 | 2/1999 |
| WO | WO 00/13851 | 3/2000 |

* cited by examiner

Primary Examiner—Timothy V. Eley
Assistant Examiner—Dung Van Nguyen
(74) Attorney, Agent, or Firm—Fish & Richardson (57) ABSTRACT

A carrier head for a chemical mechanical polishing apparatus includes a flexible membrane that applies a load to a substrate. A central portion of the flexible membrane is formed of a first material with a different rigidity than a second material that forms the annular portion of the flexible membrane.

24 Claims, 8 Drawing Sheets

CARRIER HEAD WITH MULTI-PART FLEXIBLE MEMBRANE

BACKGROUND

The present invention relates generally to chemical mechanical polishing of substrates, and more particularly to a carrier head for chemical mechanical polishing.

Integrated circuits are typically formed on substrates, particularly silicon wafers, by the sequential deposition of conductive, semiconductive or insulative layers. After each layer is deposited, it is etched to create circuitry features. As a series of layers are sequentially deposited and etched, the outer or uppermost surface of the substrate, i.e., the exposed surface of the substrate, becomes increasingly nonplanar. This nonplanar surface can present problems in the photolithographic steps of the integrated circuit fabrication process. Therefore, there is a need to periodically planarize the substrate surface. In addition, planarization is needed when polishing back a filler layer, e.g., when filling trenches in a dielectric layer with metal.

Chemical mechanical polishing (CMP) is one accepted method of planarization. This planarization method typically requires that the substrate be mounted on a carrier or polishing head. The exposed surface of the substrate is placed against a rotating polishing pad. The polishing pad may be either a "standard" or a fixed-abrasive pad. A standard polishing pad has a durable roughened or soft surface, whereas a fixed-abrasive pad has abrasive particles held in a containment media. The carrier head provides a controllable load, i.e., pressure, on the substrate to push it against the polishing pad. Some carrier heads include a flexible membrane that provides a mounting surface for the substrate, and a retaining ring to hold the substrate beneath the mounting surface. Pressurization or evacuation of a chamber behind the flexible membrane controls the load on the substrate. A polishing slurry, including at least one chemically-active agent, and abrasive particles if a standard pad is used, is supplied to the surface of the polishing pad.

The effectiveness of a CMP process may be measured by its polishing rate, and by the resulting finish (absence of small-scale roughness) and flatness (absence of large-scale topography) of the substrate surface. The polishing rate, finish and flatness are determined by the pad and slurry combination, the relative speed between the substrate and pad, and the force pressing the substrate against the pad.

A reoccurring problem in CMP is the so-called "edge-effect", i.e., the tendency of the substrate edge to be polished at a different rate than the substrate center. The edge effect typically results in non-uniform polishing at the substrate perimeter, e.g., the outermost three to fifteen millimeters of a 200 millimeter (mm) wafer.

SUMMARY

In one aspect, the invention is directed to a carrier head for a chemical mechanical polishing apparatus. The carrier head has a carrier structure and a first flexible membrane. The first flexible membrane has central portion and an annular portion surrounding the central portion. A volume between the first flexible membrane and the carrier structure provides a first pressurizable chamber. The central portion of the first flexible membrane is formed of a first material with a different rigidity than a second material that forms the annular portion of the first flexible membrane.

Implementations of the invention may include one or more of the following features. The first material may be less rigid than the second material. The first and second materials may be elastomers. The annular portion may be a perimeter portion of the first flexible membrane secured to the carrier structure. The perimeter portion may be secured between the carrier structure and a retaining ring. The first flexible membrane may include an annular connector portion extending between the central portion and the perimeter portion. The connector portion may be formed of a third material that has is more rigid than the first material and less rigid than the second material. The first and third materials may be elastomers, and the second material may be a fiber-reinforced elastomer. A second flexible membrane may be secured to the carrier structure and may extend below the first flexible membrane. A lower surface of the second flexible membrane may provide a substrate mounting surface. The annular portion may have a convolution.

In another aspect, the invention is directed to a carrier head for a chemical mechanical polishing apparatus. The carrier head has a carrier structure and a first flexible membrane. The first flexible membrane has a perimeter portion secured to the carrier structure, a central portion positioned to apply a pressure to a substrate, and a connector portion extending between the central portion and the perimeter portion. A volume between the first flexible membrane and the carrier structure provides a first pressurizable chamber. The perimeter portion of the first flexible membrane is formed of a first material, the connector portion is formed of a second material that is more rigid than the first material, and the central portion is formed of a third material that is more rigid than the second material.

Implementations of the invention may include one or more of the following features. The first and second materials may be elastomers, and the third material may be a fiber-reinforced elastomer. An annular flap may be joined to the connector portion, and an edge of the flap may be secured to the carrier structure. The flap may be formed of the first material.

In another aspect, the invention is directed to a flexible membrane for a carrier head. The flexible membrane has a central portion formed of a first material and a perimeter portion formed of a second material having a different rigidity than the first material.

Implementations of the invention may include one or more of the following features. The first material may be more rigid than the second material. The central portion may apply a pressure to a substrate, and the perimeter portion may be secured to a carrier structure.

In another aspect, the invention is directed to a flexible membrane for a carrier head that has a perimeter portion, a central portion, and a connector portion extending between the central portion and the perimeter portion. The perimeter portion of the flexible membrane is formed of a first material, the connector portion is formed of a second material that is more rigid than the first material, and the central portion is formed of a third material that is more rigid than the second material.

In another aspect, the invention is directed to a carrier head for chemical mechanical polishing. The carrier head has a carrier structure, a first flexible membrane connected to the carrier structure, and a second flexible membrane connected to the carrier structure. A first volume between the carrier structure and the first flexible membrane provides a first chamber, and a second volume between the first flexible membrane and the second flexible membrane providing a second chamber. The second flexible membrane has a lower surface that provides a mounting surface for a substrate. At least one of a top surface of the second flexible membrane and a bottom surface of the first flexible membrane is textured to prevent adhesion between the first flexible membrane and the flexible membranes when they contact.

Potential advantages of implementations of the invention may include zero or more of the following. The distribution of pressure at the substrate edge may be controlled. Both the pressure and the loading area of the flexible membrane against the substrate may be varied to compensate for non-uniform polishing. Non-uniform polishing of the substrate is reduced, and the resulting flatness and finish of the substrate are improved.

Other advantages and features of the invention will be apparent from the following description, including the drawings and claims.

BRIEF DESCRIPTION OF THE DRAWINGS

Like reference numbers are designated in the various drawings to indicate like elements.

DETAIL DESCRIPTION

Figure 1:
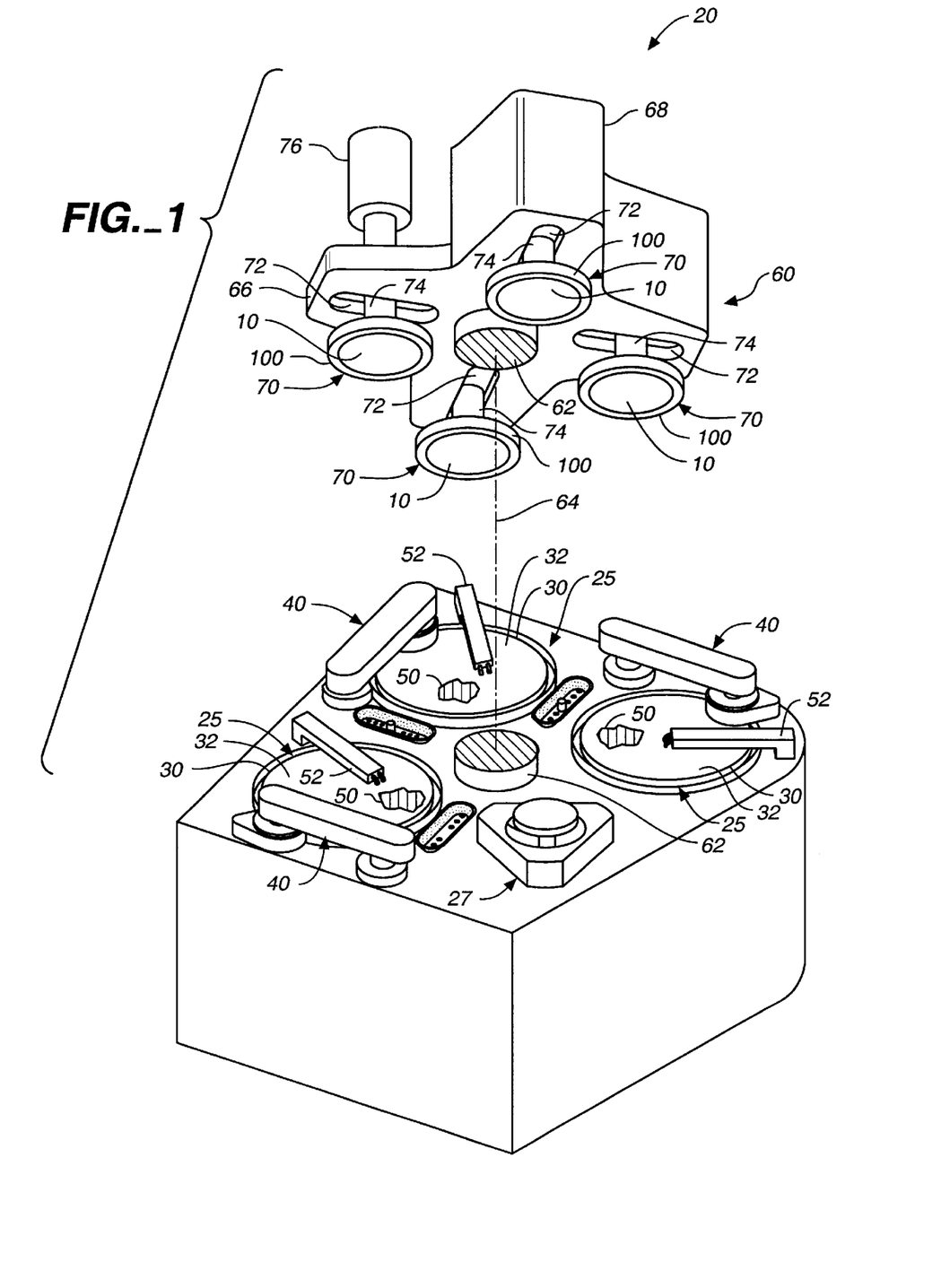
FIG. 1 is an exploded perspective view of a chemical mechanical polishing apparatus.

Referring to FIG. 1, one or more substrates 10 will be polished by a chemical mechanical polishing (CMP) apparatus 20. A description of a similar CMP apparatus may be found in U.S. Pat. No. 5,738,574, the entire disclosure of which is incorporated herein by reference.

The CMP apparatus 20 includes a series of polishing stations 25 and a transfer station 27 for loading and unloading the substrates. Each polishing station 25 includes a rotatable platen 30 on which is placed a polishing pad 32. Each polishing station 25 may further include an associated pad conditioner apparatus 40 to maintain the abrasive condition of the polishing pad.

A slurry 50 containing a chemically active agent (e.g., deionized water for oxide polishing) and a chemically-active catalyzer (e.g., potassium hydroxide for oxide polishing) may be supplied to the surface of the polishing pad 32 by a combined slurry/rinse arm 52. If the polishing pad 32 is a standard pad, the slurry 50 may also include abrasive particles (e.g., silicon dioxide for oxide polishing). Typically, sufficient slurry is provided to cover and wet the entire polishing pad 32. The slurry/rinse arm 52 includes several spray nozzles (not shown) to provide a high pressure rinse of the polishing pad 32 at the end of each polishing and conditioning cycle.

A rotatable multi-head carousel 60 is supported by a center post 62 and rotated thereon about a carousel axis 64 by a carousel motor assembly (not shown). The multi-head carousel 60 includes four carrier head systems 70 mounted on a carousel support plate 66 at equal angular intervals about the carousel axis 64. Three of the carrier head systems position substrates over the polishing stations, and one of the carrier head systems receives a substrate from and delivers the substrate to the transfer station. The carousel motor may orbit the carrier head systems, and the substrates attached thereto, about the carousel axis between the polishing stations and the transfer station.

Each carrier head system 70 includes a polishing or carrier head 100. Each carrier head 100 independently rotates about its own axis, and independently laterally oscillates in a radial slot 72 formed in the carousel support plate 66. A carrier drive shaft 74 extends through the slot 72 to connect a carrier head rotation motor 76 (shown by the removal of one-quarter of a carousel cover 68) to the carrier head 100. Each motor and drive shaft may be supported on a slider (not shown) which can be linearly driven along the slot by a radial drive motor to laterally oscillate the carrier head 100.

During actual polishing, three of the carrier heads are positioned at and above the three polishing stations. Each carrier head 100 lowers a substrate into contact with the polishing pad 32. The carrier head 100 holds the substrate in position against the polishing pad and distributes a force across the back surface of the substrate. The carrier head 100 also transfers torque from the drive shaft 74 to the substrate.

Figure 2:
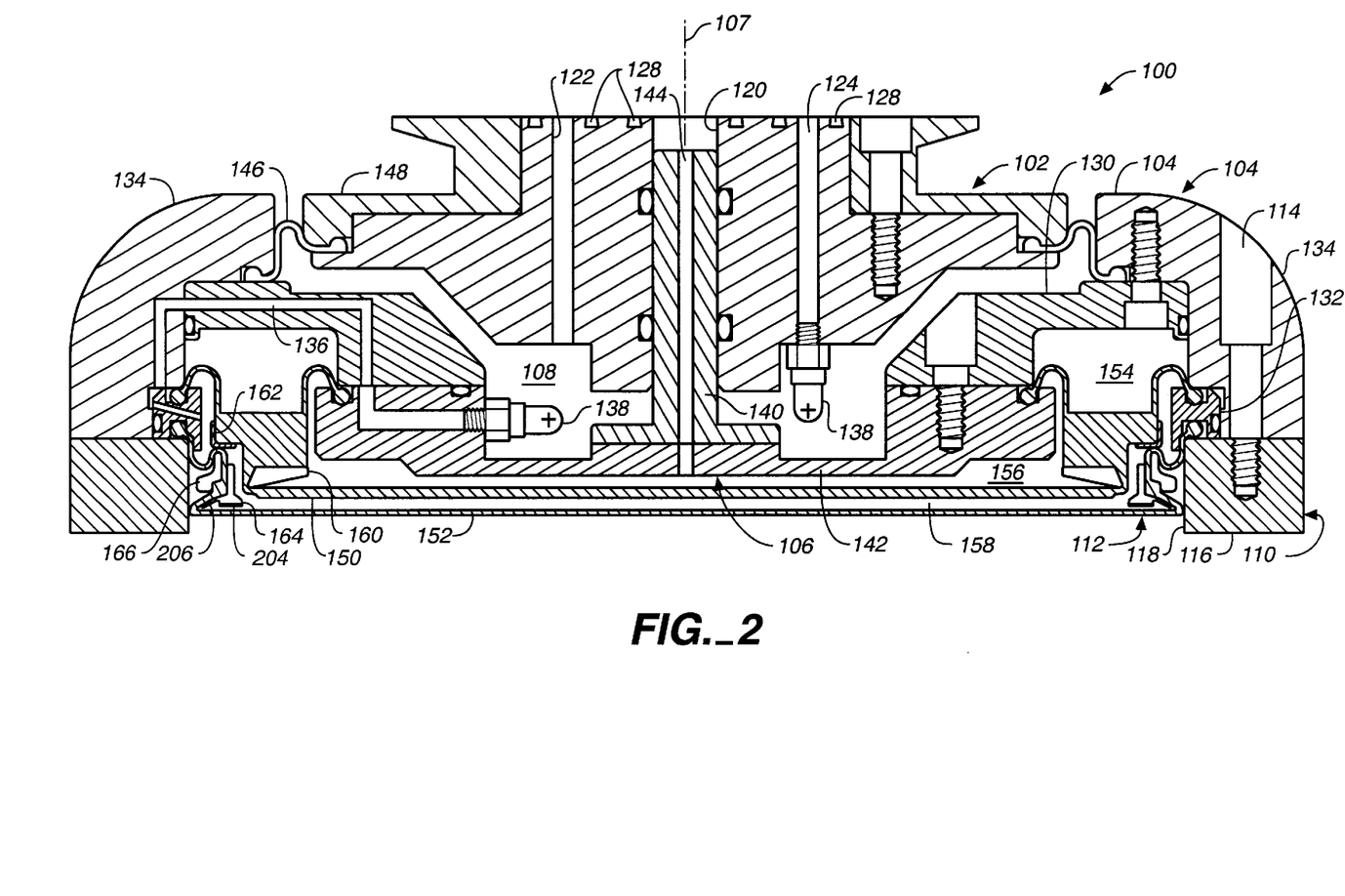
FIG. 2 is a schematic cross-sectional view of a carrier head according to the present invention.

Referring to FIG. 2, the carrier head 100 includes a housing 102, a base assembly 104, a gimbal mechanism 106 (which may be considered part of the base assembly), a loading chamber 108, a retaining ring 110, and a substrate backing assembly 112 which includes three pressurizable chambers, such as a floating upper chamber 154, a floating internal chamber 156, and an outer chamber 158. A description of a similar carrier head may be found in U.S. patent application Ser. No. 09/470,820, filed Dec. 23, 1999, the entire disclosure of which is incorporated herein by reference.

The housing 102 can be connected to the drive shaft 74 (see FIG. 1) to rotate therewith during polishing about an axis of rotation 107 which is substantially perpendicular to the surface of the polishing pad. The housing 102 may be generally circular in shape to correspond to the circular configuration of the substrate to be polished. A vertical bore 120 may be formed through the housing 102, and three additional passages (only two passages 122, 124 are illustrated in FIG. 2) may extend through the housing 102 for pneumatic control of the carrier head. O-rings 128 may be used to form fluid-tight seals between the passages through the housing and passages through the drive shaft.

The base assembly 104 is a vertically movable assembly located beneath the housing 102. The base assembly 104 includes a generally rigid annular body 130, an outer clamp ring 134, the gimbal mechanism 106, and a lower clamp ring 132. A passage 136 may extend through the body of the gimbal mechanism 106, the annular body 130, and the lower clamp ring 132, to one of the chambers in substrate backing assembly 112, e.g., the outer chamber 158. Two fixtures 138 may provide attachment points to connect a flexible tube between the housing 102 and the base assembly 104 to fluidly couple passage 124 to passage 136 and the outer chamber 158. A second passage (not shown) may extend through the annular body 130 to a second chamber in the substrate backing assembly 112, e.g., the floating upper chamber 154. Two fixtures (also not shown) may provide attachment points to connect a flexible tube between the housing 102 and the base assembly 104 to fluidly couple the unillustrated passage in the housing to the second passage in the annular body and the floating upper chamber 154.

The gimbal mechanism 106 permits the base assembly to pivot with respect to the housing 102 so that the retaining ring 110 may remain substantially parallel with the surface of the polishing pad. The gimbal mechanism 106 includes a gimbal rod 140 which fits into the vertical bore 120 and a flexure ring 142 which is secured to the annular body 130. The gimbal rod 140 may slide vertically the along the bore 120 to provide vertical motion of the base assembly 104, but it prevents any lateral motion of the base assembly 104 with respect to the housing 102 and reduces moment generated by the lateral force of the substrate against the retaining ring. The gimbal rod 140 may include a passage 144 that extends the length of the gimbal rod to fluidly couple the bore 120 to a third chamber in the substrate backing assembly 112, e.g., the internal chamber 156.

The loading chamber 108 is located between the housing 102 and the base assembly 104 to apply a load, i.e., a downward pressure or weight, to the base assembly 104. The vertical position of the base assembly 104 relative to the polishing pad 32 is also controlled by the loading chamber 108. An inner edge of a generally ring-shaped rolling diaphragm 146 may be clamped to the housing 102 by an inner clamp ring 148. An outer edge of the rolling diaphragm 146 may be clamped to the base assembly 104 by the outer clamp ring 134. Thus, the rolling diaphragm 146 seals the space between the housing 102 and the base assembly 104 to define the loading chamber 108. A first pump (not shown) may be fluidly connected to the loading chamber 108 by passage 122 to control the pressure in the loading chamber 108 and the vertical position of the base assembly 104.

The retaining ring 110 may be a generally annular ring secured at the outer edge of the base assembly 104, e.g., by bolts 114. When fluid is pumped into the loading chamber 108 and the base assembly 104 is pushed downwardly, the retaining ring 110 is also pushed downwardly to apply a load to the polishing pad 32. A bottom surface 116 of the retaining ring 110 may be substantially flat, or it may have a plurality of channels to facilitate transport of slurry from outside the retaining ring to the substrate. An inner surface 118 of the retaining ring 110 engages the substrate to prevent it from escaping from beneath the carrier head.

Figure 3:
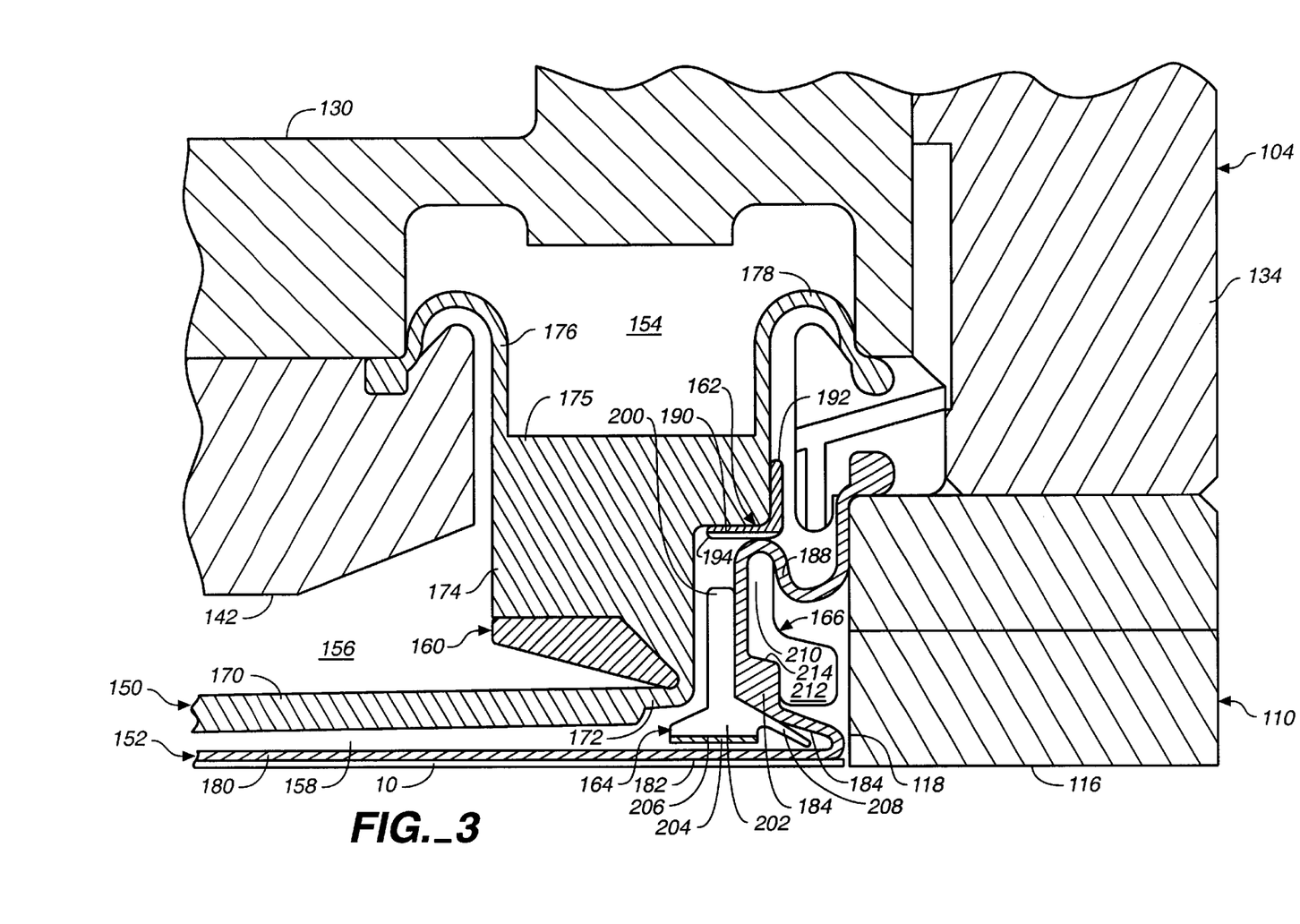
FIG. 3 is an enlarged view from a carrier head with an edge control assembly.

Referring to FIGS. 2 and 3, the substrate backing assembly 112 includes an internal membrane 150, an external membrane 152, an internal membrane support structure 160, a an upper membrane spacer ring 162, a lower membrane spacer ring 164, and an edge control ring 166. The volume between the base assembly 104 and the internal membrane 150 forms the upper chamber 154 and the internal chamber 156, and the volume between the internal membrane 150 and the external membrane 152 forms the outer chamber 158. The support structure 160, the spacer rings 162 and 164, and the control ring 166 need not be secured to the rest of the carrier head, and may be held in place by the internal and external flexible membranes.

Figure 4A:
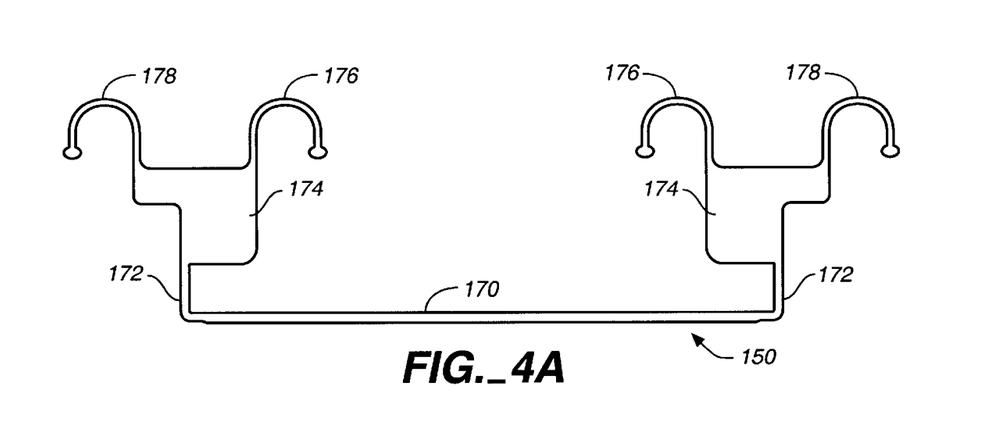
FIGS. 4A and 4B are schematic cross-sectional side views of flexible membrane assemblies from the carrier head of FIG. 2.

Referring to FIG. 4A, the internal membrane 150 includes a circular central portion 170 which will contact the external membrane 152 in a controllable area, a relatively thick annular portion 174 with an generally rectangular cross-section, an annular inner flap 176 that extends from the corner of the thick portion 174, an annular outer flap 178 that extends from the outer rim of the thick portion 174, and an annular connector portion 172 that extends between the internal support structure 160 and the lower spacer ring 164 to connect the thick portion 174 to the central portion 170. The thick portion 174 can include an annular protrusion 175 that extends radially outwardly at the top of the thick portion. The inner flap 176 and the outer flap 178 can be formed of a first elastomer, whereas the thick portion 174 and connector portion 172 can be formed of a second elastomer that has a higher durometer (i.e., is stiffer) than the first elastomer. Thus, the sidewall portions 172, 174 of the inner membrane 150 are stiffer than the inner and outer flaps 176, 178. The central portion 170 of inner membrane 150 can be formed of a fiber-reinforced elastomer which is even stiffer than the second elastomer in the sidewall portions 172, 174. In particular, the central portion 170 can be bendable but not particularly stretchable. Alternatively, the central portion 170 can have about the same rigidity as the sidewall portions 172, 174. The central portion 170 can be thicker or thinner than the connector portion 172.

Returning to FIGS. 2 and 3, the rim of the inner flap 176 is clamped between the flexure ring 142 and the annular body 130, whereas the rim of outer flap 178 is clamped between the outer clamp ring 134 and the lower clamp ring 132. The volume between the base assembly 104 and the internal membrane 150 that is sealed by the inner flap 176 provides the pressurizable floating internal chamber 156. The annular volume between the base assembly 104 and the internal membrane 150 that is sealed by the inner flap 176 and the outer flap 178 defines the pressurizable floating upper chamber 154. A second pump (not shown) may be connected to the unillustrated passage to direct fluid, e.g., a gas, such as air, into or out of the floating upper chamber 154. A third pump (not shown) may be connected to bore 120 to direct a fluid, e.g., a gas, such as air, into or out of floating internal chamber 156. As explained in greater detail below, the pressure in the chambers 154, 156, 158 will control a contact area of the internal membrane 150 against a top surface of the external membrane 152. Thus, the second, third and fourth pumps control the area of the substrate against which pressure is applied, i.e., the loading area, and the third pump controls the downward force on the substrate in the loading area.

Figure 4B:
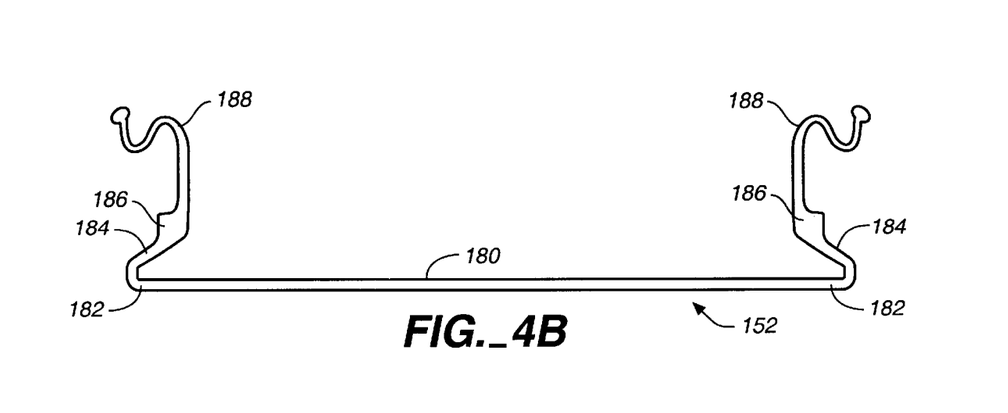

Referring to FIGS. 3 and 4B, the external membrane 152 includes a central portion 180 that provides a mounting surface to engage the substrate, and a lip portion 182 that extends back inwardly over an outer edge portion 184 of the central portion 180, a thick portion 186 located between the lower membrane spacer ring 164 and the edge control ring 166, and a perimeter portion 188 that extends between upper the membrane spacer ring 162 and the lower membrane spacer ring 164 to be secured to the base assembly. The external membrane may be pre-molded into a serpentine shape. In addition, the central portion 180 can be formed of an elastomer that is stiffer than the elastomer that forms lip portion 182, thick portion 186 and perimeter portion 188. The lip portion 182 and the outer edge portion 184 can operate to provide an active-flap lip seal during chucking of the substrate, as discussed in U.S. patent application Ser. No. 09/296,935, filed Apr. 22, 1999, the entirety of which in incorporated herein by reference.

Returning to FIGS. 2 and 3, a rim of the external membrane 152 can be clamped between the lower clamp ring 132 and the retaining ring 110. The sealed volume between the internal membrane 150 and the external membrane 152 defines the pressurizable outer chamber 158. Thus, the outer chamber 158 can actually extend below the internal chamber 156. A fourth pump (not shown) may be connected to the passage 124 to direct a fluid, e.g., a gas, such as air, into or out of the outer chamber 158. The fourth pump controls the pressure in the outer chamber 158.

The internal membrane 150 can be formed of a flexible material, such as an elastomer, elastomer coated fabric, or thermal plastic elastomer (TPE), e.g., HYTREL™ available from DuPont of Newark, Del., or a combination of these materials. The external membrane 152 can be formed of a flexible and elastic material, such as chloroprene or ethylene propylene rubber, or silicone. The bottom surface of the central portion 170 of the internal membrane 150 or the top surface of the central portion 180 of the external membrane 152 have small grooves to ensure that fluid can flow between the internal and external membranes when they are in contact. In addition or alternately, the bottom surface of the central portion 170 of the internal membrane 150 or the top surface of the central portion 180 of the external membrane 152 can have a textured rough surface to prevent adhesion between the internal and external membranes when they are in contact.

The internal support structure 160 can be a generally rigid annular body located inside the floating internal chamber 156 to maintain the desired shape of internal membrane 150. The support structure 160 can have a wedge-shaped cross-section that is thicker at the outer radius of the structure. The support structure 160 can have a flat top surface to support the rectangular thick portion 174 of the internal membrane 150, and a sloped lower surface that rests on the internal membrane 150 at its lowest point. The connector portion 172 of the internal membrane 150 extends around the lower outer corner of the internal support structure 160. The support structure 160 maintains the proper spacing between the thick portion 174 and the central portion 170 of the internal membrane 150. Alternatively, the internal support structure may be a disk-shaped body with a plurality of apertures therethrough.

The upper membrane spacer ring 162 is a generally rigid annular body which can have an "L-shaped" cross-section located in the external chamber 152. The upper membrane spacer ring 162 can be located at the lower corner of the protrusion 175 in the inner membrane 150 and can rest on the edge control ring 168. The two prongs of the "L" of the upper membrane spacer ring 162 can be formed by an inwardly extending flange 190 that extends between the inner membrane 150 and the external membrane 152, and an upwardly extending flange 192 that extends between the inner membrane 150 and the lower clamp ring 132. Thus, the lower flange 190 of the upper membrane spacer ring 162 ensures proper spacing and prevents adhesion between the upper and lower membranes 150, 152. A plurality of grooves 194 can be formed in a lower surface of the inwardly extending flange 190. The grooves 194 permit fluid to flow between the external membrane 152 and the upper membrane spacer ring 162 to ensure fluid communication between the two portions of the outer chamber 158 on either side of the upper membrane spacer ring 162.

The lower membrane spacer ring 164 is located inside the outer chamber 158 below the upper membrane spacer ring 162. The lower membrane spacer ring can be an annular body with a spur-shaped cross-section positioned between the internal membrane 150 and the external membrane 152 to maintain the desired shape of the external membrane 152 and to apply additional pressure to the edge of the substrate. Specifically, the lower membrane spacer ring 164 may have a generally rigid ring-shaped portion 200 that extends vertically from a base-piece 202. The ring-shaped portion extends between the internal membrane 150 and the external membrane 152. A compressible cushion 204 can be secured to an underside 206 of the base-piece 202. In addition, a flexible annular flange 208 projects outwardly at a downward angle from the outer rim of the base-piece 202 until it extends below the lower surface of the cushion 204. The flange 208 projects between the lip portion 182 and the outer edge portion 184 of the external membrane 152. The thick portion 186 of the external membrane 152 rests on the top surface of the triangular base-piece 202.

The edge control ring 166 is a generally annular member positioned between the retaining ring 110 and the external membrane 152. The edge control ring 166 includes a cylindrical portion 210 and a flange portion 212 which extends outwardly toward inner surface 118 of retaining ring 110 to maintain the lateral position of the external spacer ring. An overhang 214 formed in the cylindrical portion 210 can fit over the thick portion 186 so that the edge control ring 166 rests on the external membrane 152.

As discussed above, a controllable region of the central portion 200 of the internal membrane 116 can contact and apply a downward load to an upper surface of the external membrane 118. The load is transferred through the external membrane to the substrate in the loading area. In operation, fluid is pumped into or out of the floating internal chamber 156 to control the downward pressure of the internal membrane 150 against the external membrane 152 and thus against the substrate, and fluid is pumped into or out of the floating upper chamber 154 to control the contact area of the internal membrane 150 against the external membrane 152.

Figure 5A:
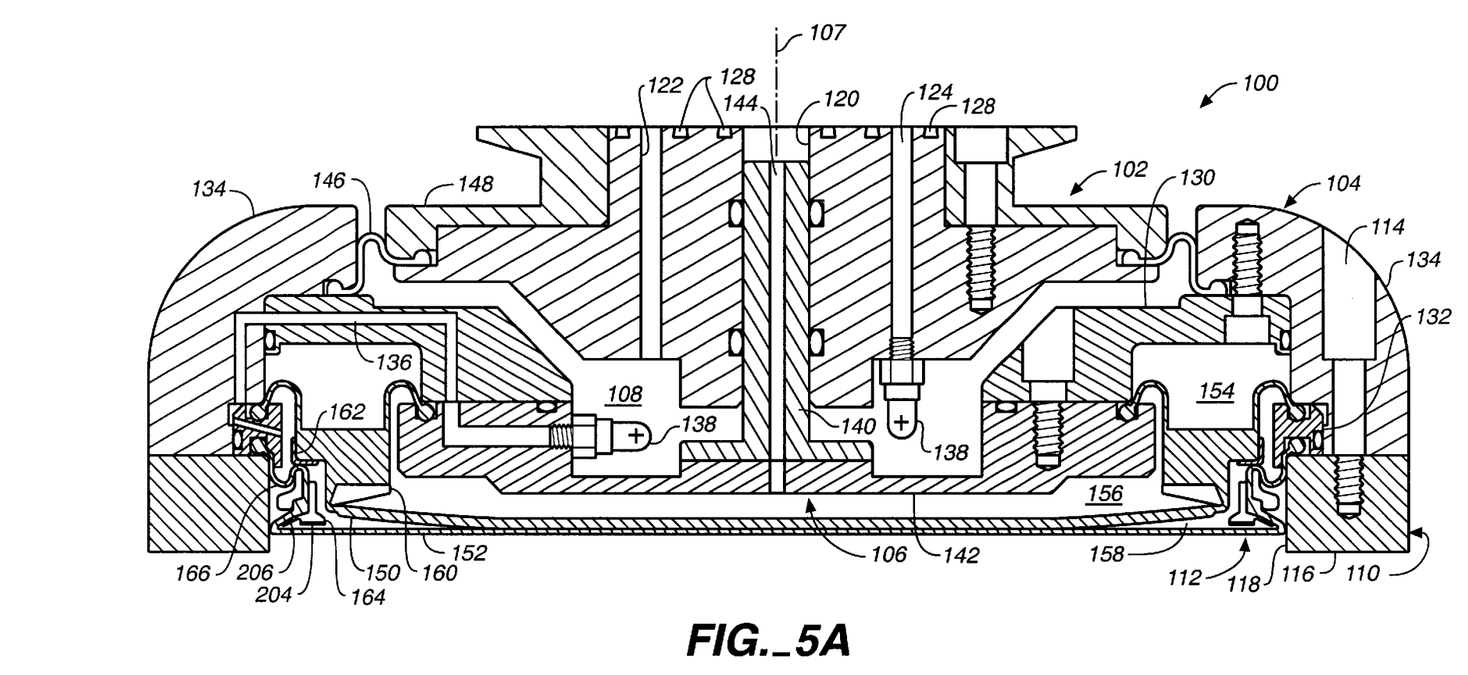
FIGS. 5A and 5B are schematic views of the carrier head of FIG. 2 illustrating the controllable loading area.
Figure 5B:
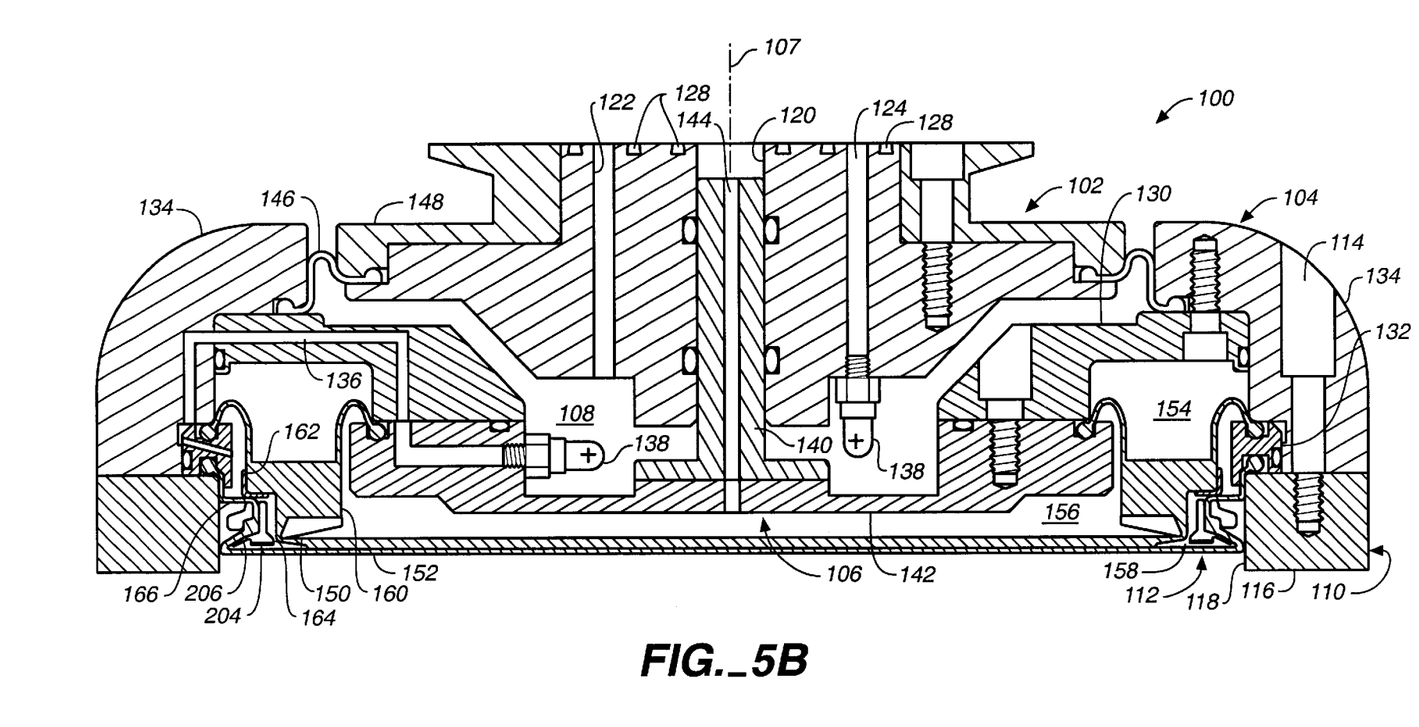

Referring to FIGS. 5A and 5B, the contact area of the internal membrane 150 against the external membrane 152, and thus the loading area in which pressure is applied to the substrate 10, may be controlled by varying the pressure in the floating upper chamber 155. By pumping fluid out of the floating upper chamber 154, the thick rectangular portion 174 of the internal membrane 150 is drawn upwardly, thereby pulling the outer edge of the central portion 170 away from the external membrane 152 and decreasing the diameter of the loading area. Conversely, by pumping fluid into the floating upper chamber 154, the thick portion 174 of the internal membrane 150 is forced downwardly, thereby pushing the central portion 170 of the internal membrane 150 into contact with the external membrane 152 and increasing the diameter of the loading area. In addition, if fluid is forced into the outer chamber 158, the thick portion 174 of the internal membrane 150 is forced upwardly, thereby decreasing the diameter of the loading area. Thus, in the carrier head 100, the diameter of the loading area will depend on the pressures in the upper, inner and outer chambers.

Figure 6A:
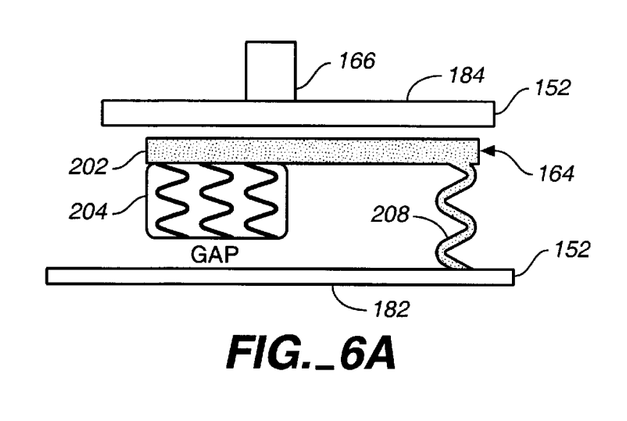
FIG. 6A and 6B are schematic diagrams illustrating the pressure and force distribution in the carrier head of FIG. 2.
Figure 6B:
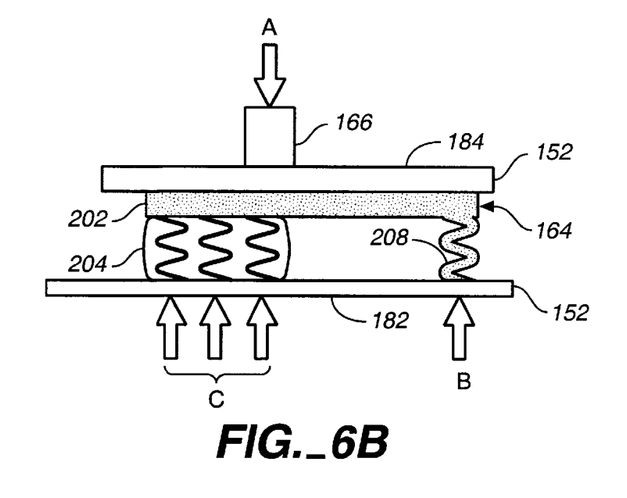

As previously discussed, one reoccurring problem in CMP is non-uniform polishing near the edge of the substrate. Referring to FIGS. 3, 6A and 6B, the edge control ring 166 and the lower membrane spacer ring 164 can be used to apply additional pressure to multiple annular regions at the perimeter of the substrate. In regular operation, the outer tip of the annular flange 208 of the lower membrane spacer ring 164 rests on the top surface of the external membrane 152 near the outermost edge of the central portion 170. However, if the upper chamber 154 is sufficiently pressurized, the rectangular portion 174 of the internal flexible membrane 150 will be driven downwardly into contact with the upper membrane spacer ring 162. This contact pressure is transmitted through the upper membrane spacer ring 162, the edge control ring 166 and the thick portion 186 of the external membrane 152 to create a downward pressure on the lower membrane spacer ring 164 (the load on the edge control ring 166 is shown by arrow A in FIG. 6B). At first, the increase in pressure in the upper chamber 155 merely increases the pressure applied by the flange 208 at the outermost edge of the substrate. However, as the pressure in the upper chamber 154 increases, the flexible flange 208 bends, and the membrane spacer ring 164 is driven downwardly until the cushion 204 contacts the top surface of the external membrane 152. At this point, the membrane support ring generates two separate annular zones of increased pressure on the substrate. The first zone (shown by arrow B) is created by the contact of the flange 208, and the second zone (shown by arrow C) is created by the contact of the cushion 204 on the external membrane. By properly selecting the dimensions of the components, this multi-zone distribution of pressure at the substrate edge can reduce polishing non-uniformity.

Carrier head 100 may also be operated in a "standard" operating mode, in which the floating chambers 156 and 158 are vented or evacuated to lift away from the substrate, and the outer chamber 158 is pressurized to apply a uniform pressure to the entire backside of the substrate.

The operations of the carrier head 100 to load a substrate into the carrier head at the transfer station 27, dechuck the substrate from a polishing pad at the polishing station 25, and unload the substrate from the carrier head at the transfer station 27, are summarized in the aforementioned Ser. No. 09/470,820.

Figure 7:
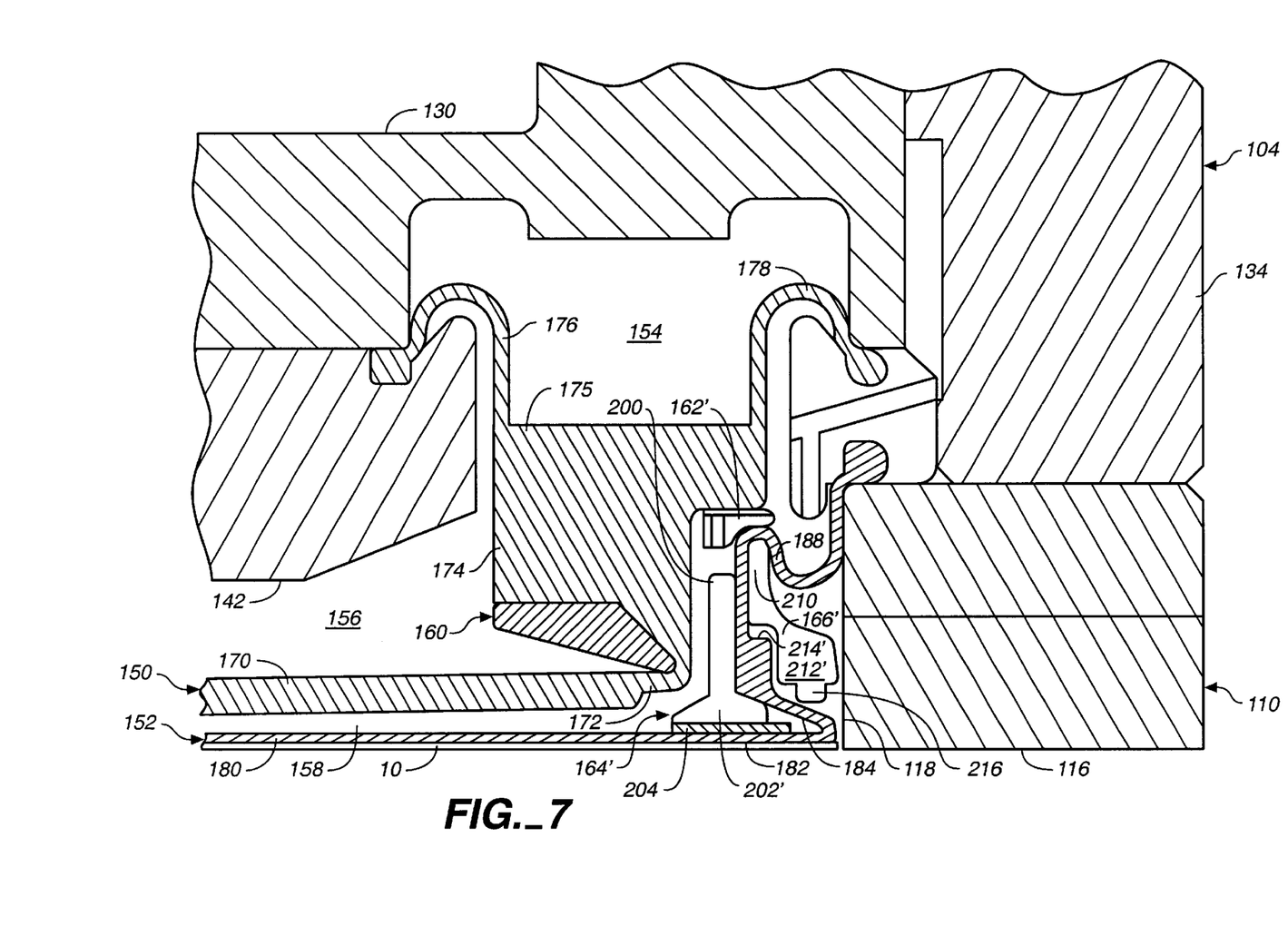
FIG. 7 is a schematic cross-sectional view of a carrier head with a rigid membrane support ring in the substrate backing assembly.

Referring to FIG. 7, in another implementation of the carrier head 100', the lower membrane spacer ring 164' is rigid and does not have a flexible flange. Instead, the edge control ring 166' includes a projection 216 that can contact the outer surface of the lip portion 184 of the external membrane 152. In addition, the cushion 204' attached to the underside of the lower membrane spacer ring 164' can extend radially outwardly beyond the lower membrane spacer ring 164'.

Figure 8A:
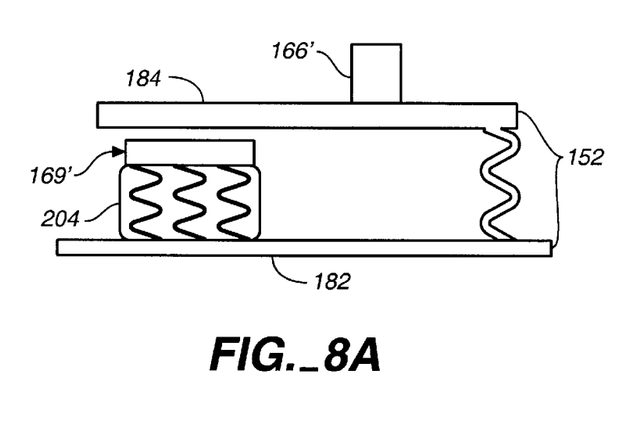
FIGS. 8A and 8B are schematic diagrams illustrating the pressure and force distribution in the carrier head of FIG. 7.
Figure 8B:
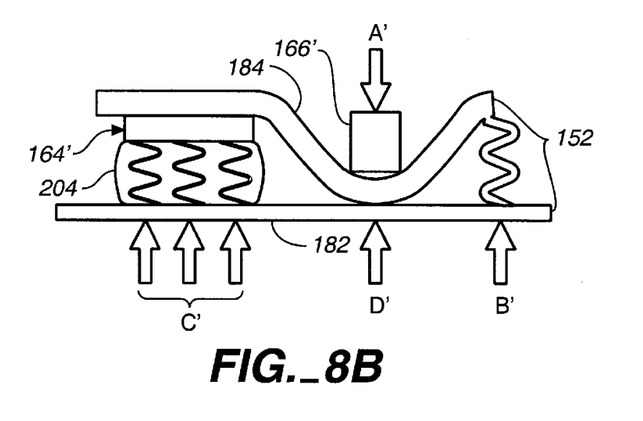

Referring to FIGS. 7, 8A and 8B, in regular operation, the cushion 204' of the lower membrane spacer ring 164' rests on the top surface of the edge portion 182 of the external membrane 152. If the floating upper chamber 154 is sufficiently pressurized, the rectangular portion 174 of the internal membrane 150 will be driven downwardly into contact with upper membrane spacer ring 162'. This contact pressure is transmitted through the upper membrane spacer ring 162 to create a downward pressure on the edge control ring 166' (shown by arrow A' in FIG. 8B), thereby causing the projection 216 to apply a downward pressure on the lip portion 182 of the external membrane 152. Since the lip portion 182 is slightly rigid, at first the load from edge control ring 166' presses the corner 183 of the lip portion 182 against the substrate, creating a first region of increased pressure (indicated by arrow B') at the very edge of the substrate. A further increase of the pressure in the upper chamber 154 brings the edge control ring 166' into contact with the thick portion 186 of the external membrane 152 and applies a downward pressure to the lower membrane spacer ring 164'. This generates an second region of increased downward pressure (indicated by arrow C') on an annular second region of the substrate interior to and separated from the first region. Increasing the pressure in the upper chamber 154 still further causes the lip portion 182 to deflect and contact the upper surface of the outer edge portion 184. This generates a third region of increased pressure (indicated by arrow D') on the substrate between the first and second portions. By properly selecting the dimensions of the components, this multi-zone distribution of pressure at the substrate edge can reduce polishing non-uniformity.

The configurations of the various elements in the carrier head, such as the flexible membranes, the spacer rings, the control ring and the support structure are illustrative and not limiting. A variety of configurations are possible for a carrier head that implements the invention. For example, the floating upper chamber can be either an annular or a solid volume. The upper and lower chambers may be separated either by a flexible membrane, or by a relatively rigid backing or support structure. The internal support structure could be either ring-shaped or disk-shaped with apertures therethrough. The carrier head could be constructed without a loading chamber, and the base assembly and housing can be a single structure.

The present invention has been described in terms of a number of embodiments. The invention, however, is not limited to the embodiments depicted and described. Rather, the scope of the invention is defined by the appended claims.

What is claimed is:

1. A carrier head for a chemical mechanical polishing apparatus, comprising:

a carrier structure; and a first flexible membrane having a central portion and an annular portion surrounding the central portion, a volume between the first flexible membrane and the carrier structure providing a first pressurizable chamber, wherein the central portion of the first flexible membrane is formed of a first material with a different rigidity than a second material that forms the annular portion of the first flexible membrane.

2. The carrier head of claim 1, wherein the first material is less rigid than the second material.

3. The carrier head of claim 2, wherein the first and second materials are elastomers.

4. The carrier head of claim 1, wherein a lower surface of the central portion of the first flexible membrane provides a substrate mounting surface.

5. The carrier head of claim 1, wherein the annular portion is a perimeter portion of the first flexible membrane.

6. The carrier head of claim 5, wherein the perimeter portion is secured to the carrier structure.

7. The carrier head of claim 6, wherein the perimeter portion is secured between the carrier structure and a retaining ring.

8. The carrier head of claim 5, wherein the first flexible membrane further includes an annular connector portion extending between the central portion and the perimeter portion.

9. The carrier head of claim 8, wherein the connector portion is formed of a third material that is more rigid than the first material.

10. The carrier head of claim 9, wherein the third material is less rigid than the second material.

11. The carrier head of claim 10, wherein the first and third materials are elastomers and the second material is a fiber-reinforced elastomer.

12. The carrier head of claim 8, wherein the connector portion is formed of a third material that has a lower durometer than the second material.

13. The carrier head of claim 1, further comprising a second flexible membrane secured to the carrier structure and extending below the first flexible membrane.

14. The carrier head of claim 13, wherein a lower surface of the second flexible membrane provides a substrate mounting surface.

15. The carrier head of claim 1, wherein the annular portion has a convolution.

16. A carrier head for a chemical mechanical polishing apparatus, comprising:

a carrier structure; and a first flexible membrane having a perimeter portion secured to the carrier structure, a central portion positioned to apply a pressure to a substrate, and a connector portion extending between the central portion and the perimeter portion, a volume between the first flexible membrane and the carrier structure providing a first pressurizable chamber, wherein the perimeter portion of the first flexible membrane is formed of a first material, the connector portion is formed of a second material that is more rigid than the first material, and the central portion is formed of a third material that is more rigid than the second material.

17. The carrier head of claim 16, wherein the first and second materials are elastomers.

18. The carrier head of claim 17, wherein the third material is a fiber-reinforced elastomer.

19. The carrier head of claim 16, further comprising an annular flap joined to the connector portion, an edge of the flap secured to the carrier structure.

20. The carrier head of claim 19, wherein the flap is formed of the first material.

21. A flexible membrane for a carrier head, comprising:

a central portion formed of a first material; and a perimeter portion formed of a second material having a different rigidity than the first material.

22. The flexible membrane of claim 21, wherein the first material is more rigid than the second material.

23. A flexible membrane for a carrier head, comprising:

a perimeter portion;

a central portion; and a connector portion extending between the central portion and the perimeter portion, wherein the perimeter portion of the flexible membrane is formed of a first material, the connector portion is formed of a second material that is more rigid than the first material, and the central portion is formed of a third material that is more rigid than the second material.

24. A carrier head for chemical mechanical polishing, comprising:

a carrier structure;

a first flexible membrane connected to the carrier structure, a first volume between the carrier structure and the first flexible membrane providing a first chamber; and a second flexible membrane connected to the carrier structure, the second flexible membrane having a lower surface that provides a mounting surface for a substrate, a second volume between the first flexible membrane and the second flexible membrane providing a second chamber, wherein at least one of a top surface of the second flexible membrane and a bottom surface of the first flexible membrane is textured to prevent adhesion between the first flexible membrane and the second flexible membrane when they contact.

* * * * *